United States Patent [19]

Talley et al.

[11] 4,288,814

[45] Sep. 8, 1981

[54] CLOSED CIRCUIT VIDEO GUIDANCE SYSTEM FOR FARMING VEHICLES AND METHOD

[75] Inventors: Bruce J. Talley; Barry G. Tolbert, both of Parker, Ariz.

[73] Assignee: Talley & Sons, Inc., Parker, Ariz.

[21] Appl. No.: 117,869

[22] Filed: Feb. 4, 1980

[51] Int. Cl.³ .............................................. H04N 7/18
[52] U.S. Cl. ................................... 358/93; 358/229; 172/430
[58] Field of Search .................. 358/93, 108, 229; 172/430

[56] References Cited

U.S. PATENT DOCUMENTS 3,101,175  8/1963  Brown, Jr. ............................ 358/93
4,247,870  1/1981  Gabel et al. .......................... 358/93

OTHER PUBLICATIONS

M. A. Mayers et al., "Closed Circuit Television System Planning" pp. 78-79, 1-31-61.

Primary Examiner—Joseph A. Orsino, Jr.
Assistant Examiner—Edward L. Coles
Attorney, Agent, or Firm—Cahill, Sutton & Thomas

[57] ABSTRACT

A guidance system for a farming vehicle includes an electronic video camera attached to the underside of the farming vehicle and a video monitor electrically coupled to the camera for assisting an operator in steering the farming vehicle. The camera is mounted behind a front guide wheel of the farming vehicle for viewing the path traversed by the front guide wheel. The video monitor is mounted near the steering wheel by which the operator controls the front guide wheel in order to steer the farming vehicle. A safety guard/light housing is provided which prevents the camera from impacting the ground or obstructions which lie in the path of the front guide wheel. Lighting devices are incorporated within the safety guard/light housing for illuminating the area viewed by the camera. Side shields are also provided to form a viewing tunnel defining the area viewed by the camera.

8 Claims, 4 Drawing Figures

U.S. Patent         Sep. 8, 1981         4,288,814
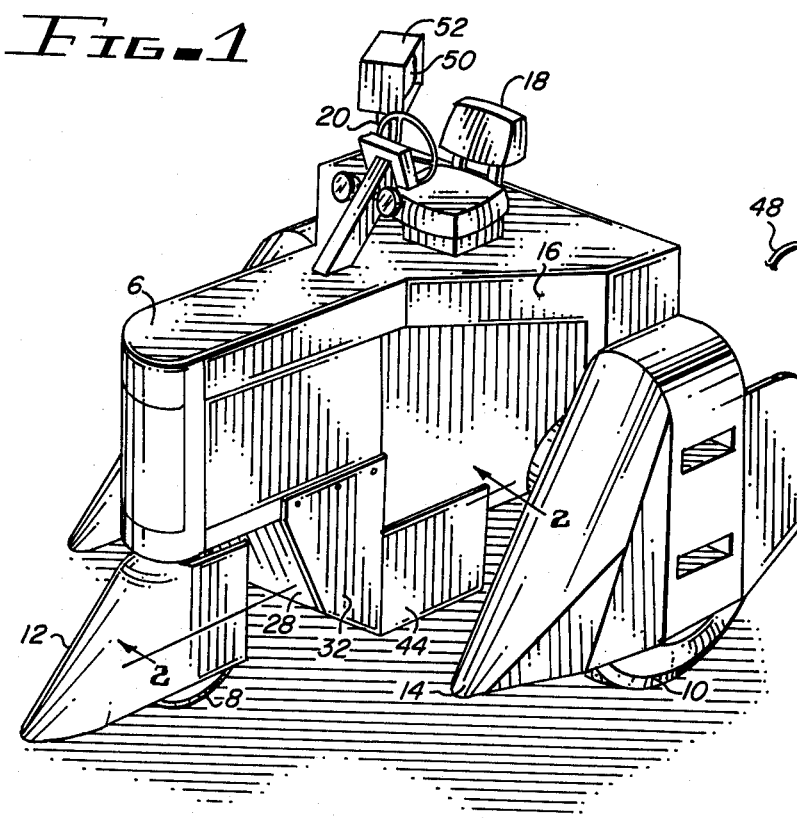
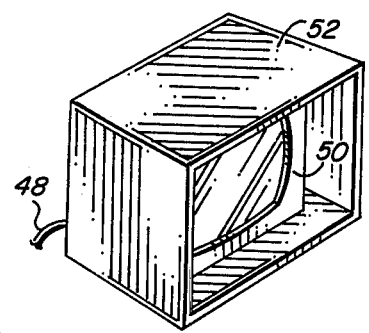
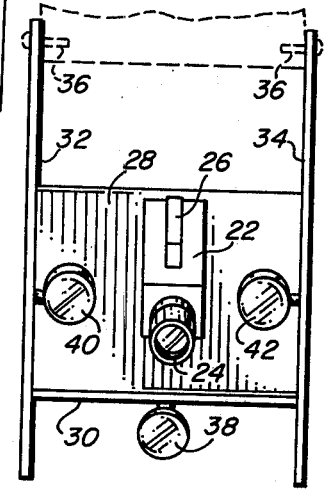
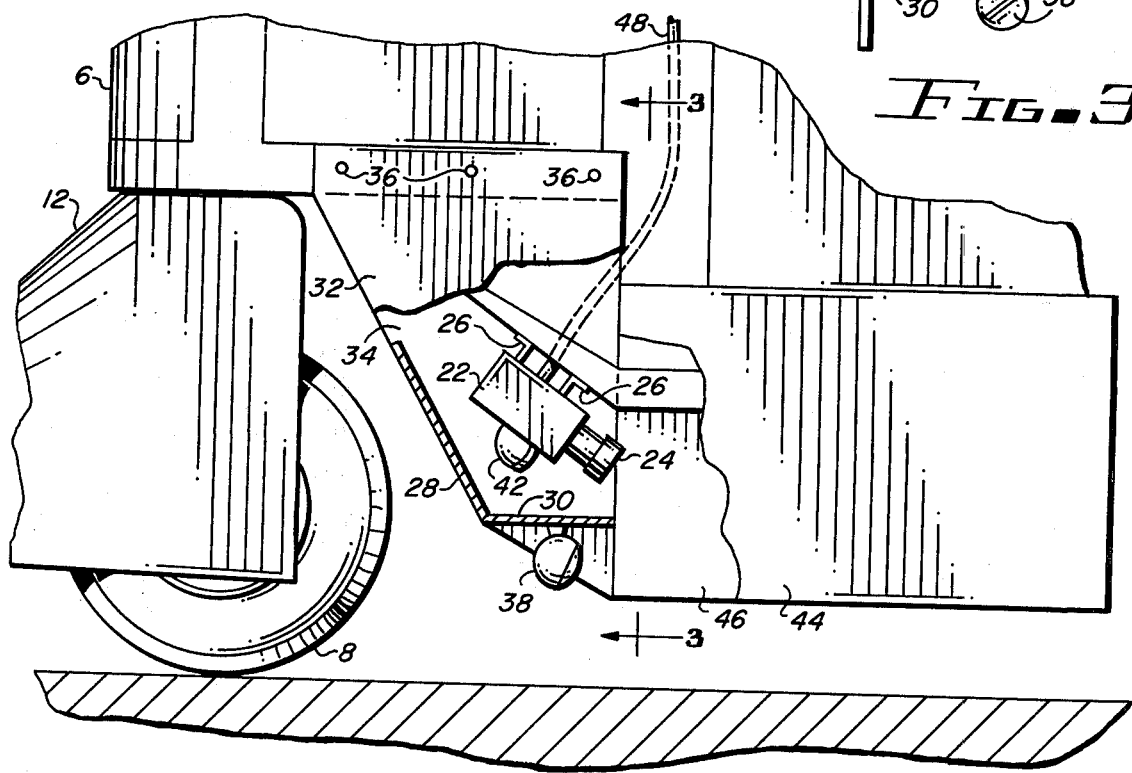

CLOSED CIRCUIT VIDEO GUIDANCE SYSTEM FOR FARMING VEHICLES AND METHOD

BACKGROUND OF THE INVENTION

1. Field of the Invention

The present invention relates generally to guidance systems for farming vehicles, and more particularly, to a closed circuit video guidance system for a farming vehicle.

2. Decription of the Prior Art

Most farm crops are planted in rows to allow the use of mechanized farm equipment for plowing, planting, fertilizing, cultivating, defoliating and harvesting the crops. Rows of crops are typically spaced forty inches apart. The wheels of most farming vehicles are laterally spaced apart from each other in increments of forty inches corresponding to the distance between adjacent rows of crops. The farming vehicle can be driven through a field of crops without injuring the crops provided that the wheels of the farming vehicle travel within the furrows between adjacent rows. The farming vehicle typically includes one or more guide wheels which can be steered by the operator for maintaining the farming vehicle properly positioned with respect to the rows of farm crops.

Some farm crops, however, grow so tall and become so dense with foliage as to make it impossible for the operator to distinguish the positions of the rows and furrows. Under these circumstances, it often happens that the wheels of the farming vehicle leave the furrows and climb onto the rows of farm crops, thereby destroying the farm crops planted within the rows.

In the Southwestern portion of the United States, it is often necessary to irrigate farm crops. Irrigation is accomplished by flooding the furrow formed between two adjacent rows of farm crops. The furrows are flooded by supplying water to the furrows at one side of the field and allowing the water to spread through the furrow to the opposite side of the field. If the wheels of a farming vehicle are allowed to cross over from one row to the next, as when the operator has difficulty distinguishing the positions of the rows, then the furrows can become blocked midway through the field. In this event, irrigation water applied to the furrows at one side of the field is prevented from reaching farm crops located on the opposite side of the field. Thus, errors in steering the farming vehicle through the field of farm crops can result in a substantial loss in the yield of the farm crops.

One such crop which particularly presents the problems discussed above is cotton. Prior to harvest, the cotton plants grow from five to nine feet tall and produce a dense foliage. The leaves of the cotton plants produce a sticky sap which can stain the cotton during ginning and degrade the quality of the cotton unless the leaves are removed prior to harvesting the cotton. Thus, it is generally necessary to defoliate the cotton plants prior to harvesting the cotton. Defoliation is accomplished by spraying a chemical defoliant onto the leaves of the cotton plants. Typically, a spray tractor is driven through the field of cotton to apply the chemical defoliant to the leaves of the cotton plants. The rows and furrows formed within the field can be perceived by an observer positioned close to the ground. However, the tractor operator is positioned several feet above the uppermost portions of the cotton plants, and his view of the ground is completely blocked by the foliage of the cotton plants. Thus, the dense foliage of the cotton plants makes it extremely difficult for the operator of the spray tractor to constantly maintain the wheels of the tractor within the furrows.

It is therefore an object of the present invention to provide a guidance system for use in conjunction with a farming vehicle which allows an operator to steer the farming vehicle in accordance with identifying markings which can be perceived at ground level but which are difficult to perceive from the position at which the operator steers the farming vehicle.

It is a further object of the present invention to provide a guidance system for use in conjunction with farming vehicles which permits an operator to maintain the farming vehicle in proper alignment with the rows in which the farm crops are planted.

It is a still further object of the present invention to provide a guidance system for use in conjunction with a farming vehicle which allows an operator to drive the farming vehicle through a field of farm crops without injuring such crops.

SUMMARY OF THE INVENTION

Briefly described, and in accordance with one embodiment thereof, the present invention relates to a closed circuit video guidance system for use in conjunction with a farming vehicle and including an electronic video camera and a video monitor. The camera is attached to the farming vehicle for viewing the area of the ground lying below the farming vehicle. The video monitor is electrically coupled to the camera for displaying the area of the ground viewed by the camera. The video monitor is attached to the farming vehicle in the vicinity of the steering wheel by which an operator controls the front guide wheel for steering the farming vehicle. The operator can then steer the farming vehicle in accordance with the information displayed by the video monitor. A safety guard may be positioned ahead of the camera for protecting the camera from impact with the ground or with obstructions lying in the path traversed by the camera. The guidance system may also include lighting devices for illuminating the area of the ground viewed by the camera. Side shields may be attached to opposite sides of the farming vehicle for forming a viewing tunnel defining the area of the ground viewed by the camera and for preventing the lower limbs of farm plants from blocking the area of the ground viewed by the camera. In one embodiment of the present invention, the camera is attached to the farming vehicle behind a centrally mounted front guide wheel, and the optic axis of the camera lens is pointed to the rear of the farming vehicle for viewing the imprint of the front guide wheel within a furrow.

BRIEF DESCRIPTION OF THE DRAWINGS

FIG. 1 is a perspective view of a farm tractor equipped with a guidance system according to the present invention.

FIG. 2 is a cross-sectional side view taken along lines 2-2 as shown in FIG. 1.

FIG. 3 is a cross-sectional view taken along lines 3-3 as shown in FIG. 2.

FIG. 4 is a perspective view of a video monitor mounted within a protective cover.

DESCRITPION OF THE PREFERRED EMBODIMENT

Shown in FIG. 1 is a farm tractor which includes a guidance system according to one embodiment of the present invention. Farm tractor 6 is a model 700 HI-CYCLE spray tractor manufactured by John Deere. Tractor 6 includes a front guide wheel 8 and also includes two back drive wheels 10 of which only one is shown in FIG. 1. Front guide wheel 8 is partially enclosed by a wheel shield 12. Similarly, each of the back drive wheels 10 is partially enclosed by a wheel shield 14. The function of wheel shields 12 and 14 is to gently spread apart the farm crops to be sprayed for allowing wheels 8 and 10 to ride within the furrows without injuring the limbs of plants that have spread over the furrows. Tractor 6 is designed for allowing a row of plants to pass beneath archway 16 as tractor 6 is driven through the field of crops.

Located on the upper portion of tractor 6 is chair 18 in which an operator sits in order to control tractor 6. Mounted directly in front of chair 18 is steering wheel 20 which controls front guide wheel 8 for steering tractor 6.

Referring to FIGS. 1, 2 and 3, an electronic video camera 22 with an associated optical lens 24 is attached by mounting bracket 26 to the underside of tractor 6 in back of front guide wheel 8. In the embodiment of the invention illustrated by FIGS. 1-3, camera 22 is a rearward viewing type camera and is accordingly positioned rearward. Camera 22 may be of the type included within an Ikegami Model RVC-200 closed circuit electronic video system. Lens 24 is a wide angle lens for maximizing the area viewed by camera 22.

By positioning camera 22 to view rearwardly rather than forwardly, it is relatively easier to protect camera 22 from impact with the ground or with obstacles lying in the path of front guide wheel 8. However, those skilled in the art will realize that camera 22 could alternatively be positioned to view forwardly without detracting from the effectiveness of the guidance system. In this alternative embodiment, camera 22 would be a forward viewing type camera rather than a rearward viewing type camera.

A safety guard/light housing is attached to the underside of tractor 6 surrounding camera 22. The safety guard/light housing includes a frontal metal plate 28 and a bottom metal plate 30 which are each attached to first and second side metal plates 32 and 34, respectively. The upper portion of each of the side plates 32 and 34 is bolted to the body of tractor 6 by bolts 36. The safety guard/light housing protects camera 22 from being damaged in the event front guide wheel 8 of tractor 6 falls into a hole, or if obstructions are encountered in the path traversed by front guide wheel 8. The safety guard/light housing also protects camera 22 in the event that the guide wheel yoke which supports front guide wheel 8 breaks while tractor 6 is being operated.

Incorporated within the safety guard/light housing are lighting devices for illuminating the area of the ground viewed by camera 22. Bottom light 38 is attached to the underside of bottom plate 30, and first and second side lights 40 and 42 are attached to the inner surfaces of first and second side plates 32 and 34, respectively. Lights 38, 40 and 42 are connected to a rheostat located near operator's chair 18 to allow the operator to control the light intensity upon the area of the ground viewed by camera 22.

Referring now to FIGS. 1 and 2, first and second side shields 44 and 46 are shown attached to the bottom of tractor 6 extending downward adjacent the rear edges of side plates 32 and 34, respectively. The function of side shields 44 and 46 is to keep the lower limbs of the plants spread apart for allowing camera 22 to view the furrow between adjacent rows of plants. Thus, side shields 44 and 46 form a viewing tunnel which defines the area viewed by camera 22. Side shields 44 and 46 may be composed of plywood, metal, or another suitable material.

Referring now to FIGS. 1 and 4, a video monitor 50 is partially enclosed by protective cover 52 which is mounted to tractor 6 in the vicinity of operator's chair 18. Video monitor 50 is positioned to be easily viewed by the tractor operator without obstructing his forward vision. Protective cover 52 shields video monitor 50 from the direct heat of the sun and also serves to shade the display screen of video monitor 50 from sunlight. Video monitor 50 is electrically coupled by cable 48 to camera 22 (see FIG. 2) for displaying the area of the ground viewed by camera 22. Video monitor 50 may be of the type included within an Ikegami Model RVC-200 closed circuit electronic video system. Although not shown in the drawings, tractor 6 is also equipped with the necessary power supply controls for operating camera 22 and video monitor 50.

During actual operation of tractor 6, the guidance system is used in the following manner. The operator of tractor 6 initially aligns front guide wheel 8 with a furrow as the tractor enters one side of the field of crops. As tractor 6 proceeds through the field of crops, front guide wheel 8 leaves a tire imprint in the furrow. The furrow and the tire imprint are viewed by camera 22 and displayed on video monitor 50. The operator of tractor 6 observes video monitor 50 and adjusts steering wheel 20 for maintaining the tire imprint of front guide wheel 8 in the middle of the furrow viewed by camera 22. In this manner, the operator can steer tractor 6 to maintain it properly aligned with the rows of farm crops and thereby avoid injury to the crops. The present guidance system has proven particularly valuable during the defoliation of cotton crops since it is often impossible for the tractor operator to distinguish the rows and furrows without the aid of the present guidance system.

While the invention has been described with reference to a preferred embodiment thereof, the description is for illustrative purpose only and is not to be construed as limiting the scope of the invention. For example, the closed circuit video guidance system could be modified for use in conjunction with a tractor which pulls a lister plow for forming ridges and furrows in a field prior to planting crops. Prior to plowing a field, a reference line is typically marked across the field, and the tractor operator attempts to steer the tractor to maintain the front guide wheel over the reference line. However, the front end of the tractor usually interferes with the operator's view of the reference line. Camera 22 can be mounted on the front end of the tractor pointing down to view the area of the ground directly ahead of the front guide wheel of the tractor. The tractor operator can view the reference line displayed on the video monitor and steer the tractor to maintain the front guide wheel in alignment with the reference line.

Similarly, application of the present invention is not limited with respect to farming vehicles having a single, centrally-mounted, front guide wheel. Other farming vehicles may include a pair of front guide wheels positioned in alignment with a pair of rear drive wheels as in the case of a common automobile. For this type of farming vehicle, the video camera may be positioned in alignment with one of the guide wheels for viewing the furrow in which the particular guide wheel travels. Alternatively, the video camera may be positioned at a point centrally located along the lateral axis of the farming vehicle for viewing the furrow located intermediate the furrows in which the guide wheels and drive wheels are maintained. Still other farming vehicles may include a pair of front drive wheels and a single, centrally-mounted, rear guide wheel. For this type of farming vehicle, the video camera could advantageously be positioned immediately ahead of the rear guide wheel to permit rearward viewing of the rear guide wheel within the furrow.

Various modifications and changes can be made to the described embodiments by those skilled in the art without departing from the true spirit and scope of the invention as defined by the appended claims.

We claim:

1. A guidance system for use in conjunction with a farming vehicle adapted to be driven through a field of crops planted in rows, the crops having relatively dense foliage making it difficult for an operator of the farming vehicle to ascertain the position of the rows, the farming vehicle having a plurality of drive wheels and at least one guide wheel, the farming vehicle also having a steering mechanism for controlling the guide wheel, the steering mechanism allowing an operator to steer the farming vehicle, the farming vehicle having a longitudinal axis corresponding to the direction in which the farming vehicle travels and also having a lateral axis perpendicular to the longitudinal axis, said guidance system comprising in combination:

a. a video camera including a lens, said lens having an optic axis;
   b. attaching means for attaching said video camera to the farming vehicle and for positioning said video camera to view an area of the ground lying below the farming vehicle for differentiating the rows in which the crops are planted from furrows formed between such rows, the optic axis of said lens being positioned to lie in a plane perpendicular to the lateral axis of the farming vehicle; and
   c. a video monitor attached to the farming vehicle in proximity to the steering mechanism and electrically coupled to said video camera for displaying the area of the ground viewed by said video camera and assisting the operator of the vehicle in ascertaining the position of the rows and furrows formed within the field;

whereby, an operator can steer the farming vehicle in accordance with the information displayed by said video monitor in order to maintain the guide wheel and the plurality of drive wheels within the furrows.

2. A guidance system as recited in claim 1 further including illuminating means attached to the farming vehicle for illuminating the area of the ground viewed by said video camera.

3. A guidance system as recited in claim 1 wherein said attaching means attaches said video camera to the farming vehicle at a point centrally located along the lateral axis of the farming vehicle.

4. A guidance system as recited in claim 1 wherein said attaching means positions said video camera rearward wherein the optic axis of said lens extends from said video camera toward the rear portion of the farming vehicle.

5. A guidance system as recited in claim 1 wherein the area of ground viewed by said video camera coincides with the path traversed by at least one of the wheels of the farming vehicle.

6. A guidance system as recited in claim 1 further including guard means attached to the farming vehicle in front of said video camera for protecting said video camera from impact with the ground or with obstructions lying in the path traversed by said video camera.

7. A guidance system as recited in claim 3 further including side shield means attached to opposing sides of the farming vehicle for maintaining lower portions of plants away from the area of the ground viewed by said video camera.

8. A guidance system as recited in claim 6 further including illuminating means mounted to said guard means for illuminating the area of the ground viewed by said video camera.

* * * * *